United States Patent
Fedeyko et al.

(10) Patent No.: US 12,011,690 B2
(45) Date of Patent: Jun. 18, 2024

(54) EXHAUST GAS TREATMENT SYSTEM

(71) Applicants: Johnson Matthey Public Limited Company, London (GB); Johnson Matthey Catalysts (Germany) GmbH, Redwitz an der Rodach (DE)

(72) Inventors: Joseph Fedeyko, Wayne, PA (US); Anthony Ferraro, Audubon, PA (US); Kenneth Koehler, Audubon, PA (US); Dirk Reichert, Redwitz (DE); Harald Scherbel, Redwitz (DE); Harald Schreiber, Redwitz (DE); Andrew Scullard, Reading (GB); Thomas Yeh, Audubon, PA (US)

(73) Assignees: JOHNSON MATTHEY PUBLIC LIMITED COMPANY, London (GB); JOHNSON MATTHEY CATALYSTS (GERMANY) GMBH, Redwitz an der Rodach (DE)

( * ) Notice: Subject to any disclaimer, the term of this patent is extended or adjusted under 35 U.S.C. 154(b) by 186 days.

(21) Appl. No.: 17/444,633

(22) Filed: Aug. 6, 2021

(65) Prior Publication Data
US 2022/0040637 A1    Feb. 10, 2022

Related U.S. Application Data

(60) Provisional application No. 62/706,326, filed on Aug. 10, 2020.

(30) Foreign Application Priority Data

Oct. 7, 2020 (EP) ..................... 20200536

(51) Int. Cl.
*B01D 53/88* (2006.01)
*B01D 53/86* (2006.01)
*B01J 20/28* (2006.01)

(52) U.S. Cl.
CPC ....... *B01D 53/885* (2013.01); *B01D 53/8634* (2013.01); *B01D 53/8668* (2013.01);
(Continued)

(58) Field of Classification Search
CPC .............. B01D 53/885; B01D 53/8634; B01D 53/8868; B01D 2255/911;
(Continued)

(56) References Cited

U.S. PATENT DOCUMENTS

2015/0118138 A1    4/2015  Jung et al.
2017/0239609 A1*   8/2017  Luisman ............. B01J 20/3242

FOREIGN PATENT DOCUMENTS

DE    4427491 A1    3/1996
EP    2581127 A1    4/2013
TW    200413083 A * 8/2004

OTHER PUBLICATIONS

TW-200413083-A English Translation (Year: 2004).*

* cited by examiner

*Primary Examiner* — Anita Nassiri-Motlagh
(74) *Attorney, Agent, or Firm* — BakerHostetler

(57) ABSTRACT

An exhaust system for the treatment of an exhaust gas comprising a species to be treated, the system comprising: a first gas inlet for providing a flow of exhaust gas; a second gas inlet for providing a flow of heated gas; a plurality of sorbent beds for releasably storing the species; one or more catalysts for decomposing the species; first and second exhaust gas outlets; and a valve system configured to establish independently for each sorbent bed fluid communication in a first or second configuration, wherein: i) in the first configuration the flow of the exhaust gas from the first gas inlet contacts a sorbent bed for storing the species and then passes to the first gas outlet; and ii) in the second configuration the flow of heated gas from the second gas (Continued)

inlet contacts a sorbent bed for releasing the species, passes to one of the one or more catalysts and then passes to the second exhaust gas outlet; wherein the valve system is configured to ensure that at least one sorbent bed is in the first configuration and, preferably at least one other sorbent bed is in the second configuration.

13 Claims, 1 Drawing Sheet

(52) U.S. Cl.
CPC ... *B01J 20/28014* (2013.01); *B01D 2255/911* (2013.01); *B01D 2255/912* (2013.01); *B01D 2257/406* (2013.01); *B01D 2257/7025* (2013.01); *B01D 2257/708* (2013.01); *B01J 2220/56* (2013.01)

(58) Field of Classification Search
CPC ........ B01D 2255/912; B01D 2257/406; B01D 2257/7025; B01D 2257/708; B01J 20/28014; B01J 2220/56
USPC .............................................. 423/213, 213.2
See application file for complete search history.

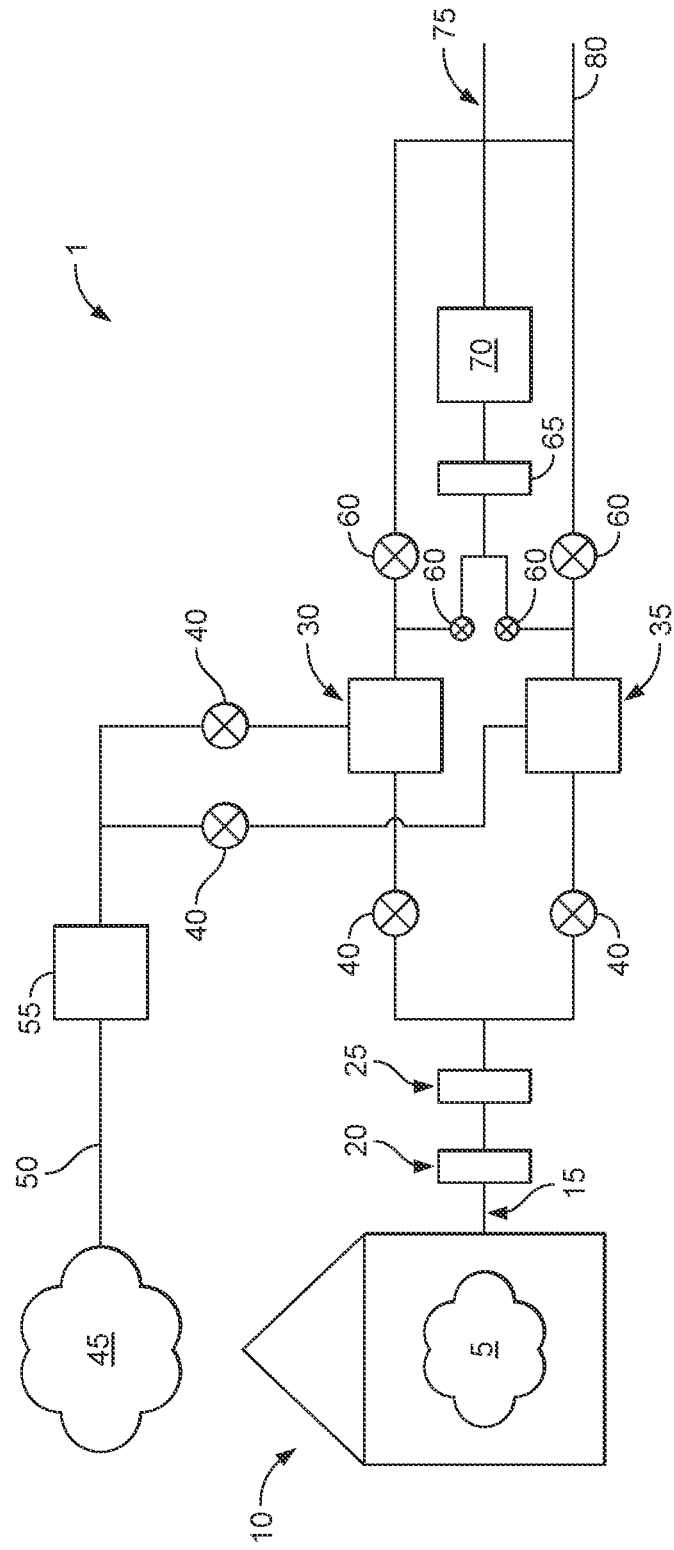

EXHAUST GAS TREATMENT SYSTEM

The present invention relates to a system and method for the treatment of an exhaust gas and, in particular, to the treatment of an exhaust gas comprising relatively low concentrations of species which need to be treated. The system may be particularly useful for treating emissions recovered comprising species such as ammonia and formaldehyde which are produced from some sources at low concentrations, such as ammonia produced from livestock houses or formaldehyde in heating, ventilation, and air conditioning (HVAC) systems.

Animals are often reared in a relatively small space such as a barn, coop, or shed ("houses"). This confined space can potentially lead to high concentrations of pollutants in the contained gas atmosphere. Typical pollutants include $NH_3$, VOCs, $H_2S$, bioaerosols such as organic or inorganic particulates which can arise from feed and manure particles and may include bacteria, and the like. Therefore, air quality within the barn is a concern for both animal and workers health. Furthermore, emissions ventilated to the outside can cause problems and may be subject to emissions limits.

For example in poultry rearing, it is required that $NH_3$ should be limited in the poultry breathing air to 25 ppm (OSHA in the US). While this is attainable, concentrations as high as 50-200 ppm are also known. Emissions typically are not constant and increase with number, age and activity of the animals (VDI 4255 part 2).

For animal breeding, the air exchange rate in the barn/house depends on the outside temperatures. In summer exchange rates may be high, whereas in colder whether it typically is very low to avoid generating too much of a draft, which can impact animal health. A low air exchange rate worsens the pollutant concentrations in the air which the animals/workers breath.

There is a particular focus at the moment on decreasing the pollutant concentrations inside of the barn and also emission to the outside. The current state-of-the-art to minimise these organic and inorganic air pollutants relies on scrubber and biofilter systems which have an associated high investment cost. In operation a relatively high volume of fresh water is used and therefore a high volume of organically-polluted grey water is attained.

Another field of application which encounters similar problems is the cleaning of building room air, in which formaldehyde, carbon monoxide and also bioaerosols pose health threats to humans.

DE 4427491 A1 relates to methods for the stationary disposal of sorbable chemical compounds comprising UV photolysis of a fluid stream comprising said compounds and ozone. Undesired by-products of said photolysis such as $NO_x$ may be treated by a catalytic converter.

EP 2581127 A1 relates to a method of air purification whereby pollutants, preferably VOCs, are broken down by means of UV radiation, preferably by means of photooxidation and residual pollutants may be oxidised by a catalytic converter.

US 2015/118138 A1 relates to an apparatus and method for decomposing an ultra-low concentration of volatile organic compounds.

Accordingly, it is desirable to provide an improved system and method for treating such exhaust gases and/or to tackle at least some of the problems associated with the prior art or, at least, to provide a commercially viable alternative thereto. In particular, it is an aim to achieve catalytic destruction of pollutants directly in the gas phase for recirculation of the air back to the inside or venting to the outside.

According to a first aspect there is provided an exhaust system for the treatment of an exhaust gas comprising a species to be treated, the system comprising:
a first gas inlet for providing a flow of exhaust gas;
a second gas inlet for providing a flow of heated gas;
a plurality of sorbent beds for releasably storing the species;
one or more catalysts for decomposing the species;
first and second exhaust gas outlets; and
a valve system configured to establish independently for each sorbent bed fluid
communication in a first or second configuration, wherein:
  i) in the first configuration the flow of the exhaust gas from the first gas inlet contacts a sorbent bed for storing the species and then passes to the first gas outlet; and
  ii) in the second configuration the flow of heated gas from the second gas inlet contacts a sorbent bed for releasing the species, passes to one of the one or more catalysts and then passes to the second exhaust gas outlet;
wherein the valve system is configured to ensure that at least one sorbent bed is in the first configuration and preferably at least one other sorbent bed is in the second configuration.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present invention allows for the direct catalytic treatment of species to be treated in the gas phase. In particular, the invention provides for treatment of air pollutants in low concentrations and at low temperature directly in the gas phase without the use of a liquid phase like in scrubber or biofilter systems. The low temperature catalytic gas treatment system can operate with only electrical power for fans and gas heaters and does not have any constantly-incurred by-products except for spent sorbent material or catalyst.

Direct treatment of a low temperature exhaust gas with a catalyst tends to have a low conversion efficiency. Known catalysts tend to operate more effectively at temperatures well above ambient. To make the input of energy to heat the exhaust gas efficient, it is not desirable to treat large volumes of exhaust gases with low contaminant concentration levels. The inventors have now found that the system and method described herein overcome these problems. In particular, the concentration of the species to be treated (or "contaminant") can be significantly increased so that the heated catalyst is only required to treat a smaller volume of contaminant-rich exhaust gas.

The inventors have found that they can apply technologies generally used in the automobile exhaust field, such as ammonia slip catalysts and ammonia storage beds, to treat low level exhaust concentrations. This system is particularly advantageous for treating gases which are provided at low temperatures (such as at or around ambient) and at low concentrations (even down to 10s of ppm levels). The following discussion will focus generally on ammonia treatment of gases from livestock houses, but it should be appreciated that the application of the system can be more broadly applied as noted below.

The present invention relates to an exhaust system for the treatment of an exhaust gas comprising a species to be treated. An exhaust gas is a gas to be emitted or discharged. In the context of the present invention, the exhaust gas is a gas containing a build-up of contaminants which needs to be treated to ensure that emissions limits are met, or to ensure that an internal environment is kept at tolerable levels in view of health and safety considerations. In the context of a livestock house (for example, a poultry house or a swine house), the exhaust gas is the air within the house which contains contaminants such as $NH_3$ produced by animals, which is taken out of the house to be processed within the exhaust gas system described herein, either to be emitted to the outside or recycled into the house atmosphere.

The system comprises a first gas inlet for providing a flow of exhaust gas. The first gas inlet provides the exhaust gas to be treated. The exhaust gas is taken from an atmosphere containing a species to be treated, such as a livestock house. The exhaust gas may be drawn into the inlet with a fan, and typically involves a conventional air intake within, for example, a livestock house air handling system.

The system comprises a second gas inlet for providing a flow of heated gas. The second gas inlet may draw in fresh air from outside of the system or may also rely on a flow of exhaust gas taken in from the atmosphere containing a species to be treated. There are advantages to drawing in fresh air since this avoids contacting contaminants with the source of heat. For example, if an electrical induction heater is used, this can become degraded with airborne contaminants during use.

Where the second gas inlet provides a flow of heated exhaust gas (rather than fresh air), the first and second gas inlets are preferably split from a single gas inlet. That is, a single exhaust gas stream is divided, such as with a y-shaped tubing configuration, to provide the first and second gas inlets as different forks in the gas flow path. Thus, the single gas inlet draws in the exhaust gas to be treated from the atmosphere containing the species to be treated and divides it into two, passing a portion to the first inlet and a portion to the second inlet. This is advantageous since a single intake can be relied upon with a single fan to circulate the gases.

The volume of gas passing through the second gas inlet may be reduced compared to the volume of gas passing through the first gas inlet. That is, a majority of gas may be used to charge the sorbent beds, but the volume of gas being used to discharge a sorbent bed is preferably reduced to minimise the gas volume to be treated. Preferably the gas flow through the second gas inlet is at most defined by the total gas volume through the system divided by the number of sorbent beds in the system, and most preferably from 0.5 to 1, more preferably 0.6 to 0.8 times this value.

The first gas inlet will provide gas at the ambient temperature of the source gas. In the context of a livestock house, this will typically be from 10 to 40° C. Preferably the exhaust gas entering the system is at a temperature at least 25° C. below an effective catalyst treatment temperature and preferably is at ambient temperature. The effective catalyst treatment temperature is a temperature at which the catalyst is capable of operating at 25% of maximum efficiency. Preferably the exhaust gas will be at 5 to 60° C., preferably at 5 to 50° C., more preferably 10 to 40° C. and most preferably 20 to 30° C.

The second gas inlet provides a flow of heated gas, such that the second gas inlet provides gas that is hotter than the gas from the first gas inlet. The system is therefore configured so that the flow of exhaust gas from the first gas inlet is at a temperature suitable for storage on the sorbent bed, whereas the flow of heated gas from the second gas inlet is at a higher temperature and is suitable for causing the release of at least a portion of the stored gas on the sorbent bed. That is, the species to be treated is then desorbed from the sorbent bed with a smaller volume of heated gas than the volume of gas from which it has been recovered (i.e. the concentration of the species is increased).

Preferably the second gas inlet incorporates a heating device for providing the flow of heated gas. Preferably the heating device is configured to provide a flow of gas at a temperature of from 100 to 600° C., preferably 100 to 350° C., preferably 150 to 200° C. The target temperature will depend on the heat needed to release stored species from the downstream sorbent bed.

The heater can be electrical or based on combustion of a fuel. Preferably the heater is a gas burner, preferably a propane, natural gas or biogas burner. These are useful especially for locations such as livestock houses, since there tend to be available supplies of propane and the like on such sites. In one embodiment, propane may be supplied with gas from the first and/or second exhaust gas outlet as an oxygen source for combustion. Such an afterburner serves to further purify the gas being treated.

The system comprises a plurality of sorbent beds for releasably storing the species. Sorbent beds are well known in the art and the material of the bed can be selected depending on the material to be stored. Suitable sorbents include, for example, activated carbon, such as activated coal, silica gel, $Al_2O_3$ and most preferably zeolite beds. These materials are well known for use in treating automobile exhaust gases. When seeking to store ammonia, for example, any known ammonia storage material composition can suitably be used. Sorbent materials are used to accumulate the material to be stored under normal flow conditions but when heated release the stored material. In this way the gaseous contaminant is concentrated on the solid storage material before being released into the gas phase in a more concentrated form.

Zeolites are constructed of repeating $SiO_4$, $AlO_4$, tetrahedral units linked together, for example in rings, to form frameworks having regular intra-crystalline cavities and channels of molecular dimensions. The specific arrangement of tetrahedral units (ring members) gives rise to the zeolite's framework, and by convention, each unique framework is assigned a unique three-letter code (e.g., "CHA") by the International Zeolite Association (IZA). Zeolites may also be categorised by pore size, e.g. a maximum number of tetrahedral atoms present in a zeolite's framework. As defined herein, a "small pore" molecular sieve, such as CHA, contains a maximum ring size of eight tetrahedral atoms, whereas a "medium pore" molecular sieve, e.g. MFI, contains a maximum ring size of ten tetrahedral atoms; and a "large pore" molecular sieve, such as BEA, contains a maximum ring size of twelve tetrahedral atoms.

A most preferred zeolite for the storage of ammonia is a small-pore zeolite. Small pore zeolites are more selective for ammonia and so may reduce competition for ammonia storage when other gaseous species are present. Preferably the small-pore zeolite has a framework structure selected from the group consisting of AEI, AFT, AFV, AFX, AVL, CHA, EMT, GME, KFI, LEV, LTN, and SFW, including mixtures of two or more thereof. It is particularly preferred that the zeolite has a CHA or AEI-type framework structure.

The zeolite may be in its H+-form or may be loaded (for example, ion-exchanged) with a metal. Copper and/or iron loading is particularly preferred. Where a metal-loaded zeolite is employed, the zeolite may have a metal-loading in the range 1 to 6 wt %, preferably 3-5.5 wt % and most preferably about 4 wt %.

The sorbent material may preferably be disposed on a suitable substrate such as a honeycomb monolith, a corrugated substrate (such as corrugated glass-paper or quartz fibre sheet) or a plate. Alternatively, the sorbent material (storage material) itself may be extruded in the form of a monolith or in the form of pellets or beads. For example, the sorbent material may comprise a packed bed of sorbent bead material. The nature of the sorbent material will depend on the backpressure requirements of the system.

Most preferably the sorbent material comprises one or more zeolites or activated carbon. Preferably the sorbent material comprises a mixture of two or more zeolites. These may be provided in a zoned configuration with different zeolites in different regions of the storage material.

In one embodiment the sorbent material may be provided with a material suitable for the storage of volatile organic compounds (VOC). The storage and treatment of VOCs may allow for the odour of a livestock house to be ameliorated, as well as avoiding any associated health risks.

Volatile organic compounds can also be present in livestock house environments, either released from the animals or their environment (including feed and bedding). VOCs are defined by the WHO, as cited in ISO 16000-6, as any organic compound whose boiling point is in the range from (50° C. to 100° C.) to (240° C. to 260° C.), corresponding to having saturation vapour pressures at 25° C. greater than 102 kPa. VOCs include alcohols, aldehydes, amines, esters, ethers, hydrocarbons (up to about C10), ketones, nitrogen-containing compounds, phenols, indoles and other aromatic compounds, terpens and sulphur containing compounds. These are discussed in "characterisation of odour released during handling of swine slurry: Part I. Relationship between odorants and perceived odour concentrations" Blanes-Vidal et. al. Atmospheric Environment 43 (2009) 2997-3005, incorporated herein by reference.

In an embodiment the sorbent bed comprises two different sorbent materials for different species to be treated. For example, the system may be configured to treat ammonia and VOCs simultaneously. The material suitable for the storage of volatile organic compounds (VOC) may be the same material for the storage of ammonia, or a further material may be provided which has better storage performance for VOCs than ammonia. For example, a suitable material for the storage of a VOC would be a medium or large pore zeolite. At the same time a small pore zeolite would be present for the ammonia. Therefore, a mixture (in a mixed, zoned or layered configuration) of a small pore zeolite (for ammonia) and a medium/large pore zeolite (for VOCs) could be provided. Examples of preferred large pore zeolites include zeolite Y and Beta. In such embodiments the VOCs will be released at the same time and decomposed with the same oxidation catalyst. This may require higher catalyst temperatures than for ammonia alone.

Accordingly, in a preferred embodiment an ammonia storage material is provided together with a VOC storage material, wherein the ammonia storage material comprises a small pore zeolite and wherein the VOC storage material comprises a medium or large pore zeolite. Preferably the ammonia storage material and the VOC storage material are provided as a mixture, or in distinct zones, or in layers. For zoned configurations one material will be upstream of the other.

The number of sorbent beds required will depend on the size of the sorbent beds and the amount of the species to be treated. It may, for example, be desirable to have a large number of sorbent beds, but only have a subset in use. This will allow the capacity of the system to scale, for example to scale with animals as they age and produce more ammonia.

The system further comprises one or more catalysts for decomposing the species. By the term, "decomposing" it is meant that the species is treated so as to be converted into one or more other chemical species. The decomposed species is preferably converted so as to become one or more less harmful chemical species, such as converting ammonia into nitrogen and water.

Consequently, the present invention finds particular application in the treatment of an exhaust gas comprising ammonia since the inventors have found that a catalyst as described herein may be used to convert the ammonia into essentially nitrogen gas ($N_2$) and water ($H_2O$). On the contrary, known systems based on UV oxidation with ozone and photolysis result in the complete oxidation of any nitrogen present in the exhaust stream which leads to the generation of harmful nitrogen oxides ($NO_x$) which is advantageously avoided using the present system.

Accordingly, it is preferred that the exhaust system does not comprise a photoreactor, a means for generating UV light or a means for generating ozone. It follows that the method preferably does not comprise photolysis or ozonolysis (i.e. suppling ozone for the oxidation of the species).

The nature of the catalyst will be determined by the species to be treated. Nonetheless, suitable catalysts for decomposing species are well known in the art. For ammonia, for example, materials known for use in ammonia slip catalysts are well known. The catalyst may comprise one or more PGMs, for example and may have a layered or zoned configuration.

The system comprises first and second exhaust gas outlets. The first exhaust gas outlet is for gas flowing simply past the sorbent bed, so that the gas passing out of the outlet has had the species to be treated adsorbed into the sorbent bed. The second exhaust gas outlet is for gas flowing away from the treatment catalyst, so that the species to be treated has been decomposed. In both cases the gas leaving the first and second gas outlets is depleted of the species to be treated. The level of depletion should be sufficient to meet the required emissions limits, but this will vary depending on the nature of the species.

The system comprises a valve system configured to establish independently for each sorbent bed fluid communication in a first or second configuration, wherein:
i) in the first configuration the flow of the exhaust gas from the first gas inlet contacts a sorbent bed for storing the species and then passes to the first gas outlet; and
ii) in the second configuration the flow of heated gas from the second gas inlet contacts a sorbent bed for releasing the species, passes to one of the one or more catalysts and then passes to the second exhaust gas outlet;

The valve system is configured to ensure that at least one sorbent bed is in the first configuration and preferably at least one other sorbent bed is in the second configuration. As will be appreciated, the first configuration will result in the species being stored within the sorbent bed, whereas the second configuration will result in the species being released from the sorbent bed.

In general use the valve system will be configured to ensure that at least one sorbent bed is in the first configuration and at least one other sorbent bed is in the second configuration. It should of course be appreciated that this configuration is contemplated for the system when in operation, whereas during start-up or under certain conditions it may be required that all of the sorbent beds are in the first configuration storing the species so that there is a sufficient quantity to be treated. For example, if it takes 24 hours to charge a sorbent bed, but one hour to discharge the sorbent bed, then each bed will have non-overlapping discharging windows, but overlapping charging windows.

Preferably the valve system is configured to ensure that one sorbent bed is in the second configuration, and the remainder of the plurality of sorbent beds are in the first configuration. This means that where there are multiple sorbent beds, several are recharging and one is being discharged at each moment. In one embodiment there are two beds so that one is charging while one is discharging. In embodiments which store two species, such as ammonia and VOCs, these will also be released simultaneously.

Preferably the valve system is further configured to establish independently for each sorbent bed fluid communication a third configuration for cooling of the sorbent bed, wherein gases are prevented from leaving the sorbent bed. This is a desirable option because it prevents a circumstance whereby the sorbent bed is either connected to the first outlet but is still releasing levels of the stored species, or connected to the second outlet but is not being supplied at a sufficient temperature for catalyst treatment. In both cases there is a risk of undesirable species slip from the system. In an embodiment with three beds there would be one bed discharging, one bed cooling and one bed recharging, or one bed discharging and two beds recharging.

Preferably the exhaust gas passing into the system through the first inlet comprises from 1 to 5000 ppm of the species, preferably from 1 to 1000 ppm and most preferably from 1 to 500 ppm, such as 1 to 250 ppm and most preferably 1 to 100 ppm. The benefit of the invention is that the releasable storage achieved in the sorbent bed permits a concentration of the species. Preferably the concentration of the species passed to the one or more catalysts is at least 2 times greater than the initial exhaust gas, preferably at least 5 times and more preferably at least 10 times greater.

A preferred species to be treated in an exhaust gas is ammonia. When the species is ammonia, the catalyst is an ammonia oxidation catalyst and each sorbent bed comprises an ammonia storage material. As noted above, ammonia levels in a livestock house are desirably at most 20 ppm, but levels as high as 50 ppm may be observed. Therefore, the exhaust gas to be treated will contain from 2 to 250 ppm, preferably from 5 to 50 ppm and most preferably from 10 to 30 ppm. Gases leaving the exhaust gas system, either because of storage or decomposition, should have ammonia levels reduced to less than 20 ppm, preferably less than 10 ppm, more preferably less than 5 ppm and most preferably less than 1 ppm.

A preferred species to be treated in an exhaust gas is formaldehyde. When the species is formaldehyde the catalyst is a formaldehyde oxidation catalyst and each sorbent bed comprises a formaldehyde storage material. Formaldehyde levels are a problem in environments above 0.1 ppm so the system described herein coupled to an HVAC system needs to ensure that the formaldehyde concentration after treatment is less than 100 ppb, such as less than 50 ppb.

Another preferred species to be treated in an exhaust gas is methane. When the species is methane, the catalyst is a methane oxidation catalyst and each sorbent bed comprises a methane storage material. It is known that methane can be stored in certain metal-organic framework materials (MOF). The storage temperatures for efficient methane storage may require cooling of the sorbent beds. The catalyst for this application may comprise one or more PGMs.

Another preferred species to be treated in an exhaust gas are VOCs. When the species comprises VOCs, the catalyst is an oxidation catalyst and each sorbent bed comprises a VOC storage material.

Depending on the source of the exhaust gas it may be necessary to treat two or more of the above different preferred species simultaneously, such as providing the sorbent beds with two or more different sorbent materials and potentially employing two different catalysts. The sorbent materials and/or the catalysts could be provided in zoned or layers configurations.

The ppm concentrations of all of the above species may of course fluctuate because of the natural source of the species to be treated. The above ranges for concentrations are the average concentrations over the operating period of the exhaust gas system, excluding any start-up or warm-up period required for the system.

Preferably the system comprises one or more fans to push or pull gases through the system. The configuration of such a fan will depend on the desired air exchange rate required in the atmosphere to be treated.

Preferably the system further comprises one or more material filters to pre-filter the exhaust gas. Such filters are for recovering matter which could enter the system and clog or degrade the components of the system. For example, for poultry houses, there is a risk of feathers, fluff, straw and dust to be entrained into the air system which can be removed by such filters.

Preferably the system comprises a sorbent material for further contaminants upstream of the plurality of sorbent beds, wherein the further contaminant is selected from one or more of As, $SO_2$, $SO_3$, $H_2S$, Hg and Cl. By Hg and Cl it is meant any suitable mercury-containing and chlorine-containing species, respectively. Such contaminants are desirably removed in order to ensure that the one or more catalysts are not poisoned.

Preferably the system further comprises one or more sensors for the species in communication with each sorbent bed to determine a species loading status. Preferably the sensors are ammonia sensors in communication with each sorbent bed to determine an ammonia loading status. This can be used to control the valve system to ensure that beds are discharged before they become over full. Thus, the sensor detects the loading status and changes to a further flow path to store the pollutant in the storage medium when the Emission Limit of the pollutant in question over the storage medium is reached. By the term "ammonia sensor" it is meant any sensor that is capable of providing an indication of ammonia loading levels. A preferred sensor is an automotive $NO_x$ sensor since these are not expensive and since they cannot distinguish between $NH_3$ and $NO_x$, where only $NH_3$ is present, the output of the $NO_x$ sensor gives an indication of $NH_3$ levels. Such sensors are well known in the art.

Preferably a further heater is provided immediately upstream of the one or each catalyst and after the sorbent bed being discharged with the heated gas flow. This is to ensure that the species released from the sorbent material is at a treatment temperature where the catalyst is working at a suitable efficiency. For ammonia treatment, for example, the catalysts typically have an optimal performance between 200 and 300° C. Accordingly, a further heater can be provided to ensure that the exhaust gas is raised to such a treatment temperature before contacting the catalyst. The specific heat achieved by this further heater will depend on the application and could be set by the person skilled in the art. The further heater can be electrical or based on combustion, as discussed above, such as a propane burner.

One or more of the filters, sorbent beds or catalysts described herein may comprise copper. Copper is known to have an antiviral effect. Thus, the presence of the copper in the system to contact the exhaust gas may have an antiviral effect which could reduce transmission of viruses via the exhaust gas. For example, a zeolite included in an ammonia storage material may comprise copper. Such copper may be loaded by ion exchange onto the zeolite. Preferably the copper-loading of the zeolite is in the range from 1 to 6 wt % of the zeolite.

According to a further aspect there is provided a complete system comprising both the source of the exhaust gas system to be treated and the exhaust gas system as described herein. Particular sources of the exhaust gas which may be especially suitable are a livestock house, HVAC installation or waste water treatment plant. A further example is a mine with a methane exhaust.

According to a further aspect there is provided a method of treating an exhaust gas comprising a species to be treated, the method comprising passing the exhaust gas through the exhaust gas system as described herein.

The invention will now be described in relation to the following non-limiting figures, in which:

FIG. 1 shows a schematic of an exhaust system according to claim 1.

FIG. 1 shows an exhaust gas system 1 as described herein. The exhaust gas system 1 is configured to process an exhaust gas 5 from a livestock house 10. The exhaust gas 5 passes through an exhaust gas inlet 15 into the exhaust gas treatment system 1.

The exhaust gas 15 passes through a coarse material filter 20 to remove matter such as poultry feathers and then through a $H_2S$ sorbent filter 25. The exhaust gas 5 then passes to either a first sorbent bed 30 or a second sorbent bed 35, depending on a valve system comprising valves 40.

A source of fresh air 45 is fed through a fresh air inlet 50 to a propane heater 55. Depending on the valve system, the heated fresh air passes to either the first sorbent bed 30 or the second sorbent bed 35.

The valves 40 of the valve system is configured so that one of the first sorbent bed 30 and the second sorbent bed 35 receives the exhaust gas 5 and the other receives the fresh air 45.

A further valve system comprising further valves 60 is provided to direct the gas leaving the first sorbent bed 30, via an electrical heater 65 to an ammonia oxidation catalyst 70 and to a catalyst-treated exhaust gas outlet 75, or directly to a further exhaust gas outlet 80. At the same time the further valves 60 are configured to direct the gas leaving the second sorbent bed 35 to the other outlet (80, 75).

In one embodiment gas leaving the catalyst-treated exhaust gas outlet 75 or the further exhaust gas outlet 80 may be recycled to the heater 55 as a combustion gas.

In one embodiment gas leaving the sorbent bed 30, 35 may be recycled into the house 10. In one embodiment gas leaving the catalyst-treated exhaust gas outlet 75, together with a larger exhaust mass flow towards 80 may be recycled into the house 10 if the mixing temperature of both streams permit.

The invention will now be described in relation to the following non-limiting example.

EXAMPLE 1

$NH_3$ in a poultry coop with 30,000 broilers is taken here as a model pollutant. Typical $NH_3$ concentrations are around 15 ppm. The inside air in the barn will be polluted with 2700 grams of $NH_3$ per hour. Assuming a two-leg installation (i.e. 2 sorbent beds) and a loading time of 30 minutes for either $NH_3$ storage, 60 kg of active charcoal or 20 kg of zeolite per leg would have to be used for the sorption phase.

In the desorption phase of each leg, a relatively small fresh air stream is heated to 250° C., resulting in desorption peak concentrations of, for example, 1000 ppm $NH_3$. This pollutant-laden, small gas stream is then directly fed to a catalytic reactor in which an ammonia oxidation catalyst (AMOX) is placed. An AMOX converts part of the $NH_3$ to NO. Subsequently, $NH_3$ and NO react with each other to form air-borne, harmless nitrogen and water. At aforementioned reaction conditions, $NH_3$ conversions of over 95% were experimentally proven.

Although preferred embodiments of the invention have been described herein in detail, it will be understood by those skilled in the art that variations may be made thereto without departing from the scope of the invention or of the appended claims.

The invention claimed is:

1. An exhaust system for the treatment of an exhaust gas comprising ammonia, the system comprising:
   a first gas inlet for providing a flow of exhaust gas;
   a second gas inlet for providing a flow of heated gas;
   a plurality of sorbent beds, wherein each sorbent bed comprises an ammonia storage material for releasably storing ammonia, wherein the ammonia storage material is small-pore zeolite having a framework structure selected from the group consisting of AEI, AFT, AFV, AFX, AVL, CHA, EMT, GME, KFI, LEV, LTN, and SFW, including mixtures of two or more thereof;
   one or more ammonia oxidation catalysts;
   first and second exhaust gas outlets; and
   a valve system configured to establish independently for each sorbent bed fluid communication in a first or second configuration, wherein:
      i) in the first configuration the flow of the exhaust gas from the first gas inlet contacts a sorbent bed for storing ammonia and then passes to the first gas outlet; and
      ii) in the second configuration the flow of heated gas from the second gas inlet contacts a sorbent bed for releasing the species, passes to one of the one or more ammonia oxidation catalysts and then passes to the second exhaust gas outlet;
   wherein the valve system is configured to ensure that at least one sorbent bed is in the first configuration and, at least one other sorbent bed is in the second configuration.

2. The exhaust system according to claim 1, wherein exhaust gas comprises from 1 to 5000 ppm of ammonia.

3. The exhaust system according to claim 1, wherein the second gas inlet incorporates a heating device for providing the flow of heated gas.

4. The exhaust system according to claim 3, wherein the heating device is configured to provide a flow of gas at a temperature of from 100 to 600° C.

5. The exhaust system according to claim 1, wherein an exhaust gas is supplied to both the first and second gas inlets, or wherein the second gas inlet is an air inlet.

6. The exhaust system according to claim 1, wherein the system further comprises one or more material filters to pre-filter the exhaust gas.

7. The exhaust system according to claim 1, wherein the system comprises a contaminant sorbent material upstream of the plurality of sorbent beds, wherein the contaminant is selected from one or more of As, $SO_2$, $SO_3$, $H_2S$, Hg and Cl.

8. The exhaust system according to claim 1, wherein the valve system is configured to ensure that one sorbent bed is in the second configuration, and the remainder of the plurality of sorbent beds are in the first configuration.

9. The exhaust system according to claim 1, the system further comprising one or more ammonia sensors in communication with each sorbent bed to determine an ammonia loading status.

10. The exhaust system according to claim 1, comprising a heater wherein the heater is a propane, natural gas or biogas burner.

11. The exhaust system according to claim 10, wherein a further heater is provided immediately upstream of the one or each ammonia oxidation catalyst.

12. The exhaust system according to claim 1, wherein the valve system is further configured to establish independently for each sorbent bed fluid communication a third configuration for cooling of the sorbent bed, wherein gases are prevented from leaving the sorbent bed.

13. A livestock house, HVAC installation, waste water treatment plant, or a mine, comprising the exhaust-gas system according to claim 1.

* * * * *